(12) United States Patent
Peek

(10) Patent No.: US 7,243,888 B2
(45) Date of Patent: Jul. 17, 2007

(54) SYSTEM AND APPARATUS FOR MOUNTING A TAXIDERMY TROPHY

(76) Inventor: Russell Van Peek, 1945 Spring Dr., Roanoke, TX (US) 76262

( * ) Notice: Subject to any disclaimer, the term of this patent is extended or adjusted under 35 U.S.C. 154(b) by 12 days.

(21) Appl. No.: 11/194,170

(22) Filed: Aug. 1, 2005

(65) Prior Publication Data

US 2007/0023601 A1    Feb. 1, 2007

(51) Int. Cl.
*F16B 45/00* (2006.01)
(52) U.S. Cl. ............... 248/304; 248/309.2; 434/296
(58) Field of Classification Search ............ 248/304, 248/309.2, 303, 902; 434/296; 428/542.4, 428/16
See application file for complete search history.

(56) References Cited

U.S. PATENT DOCUMENTS

| 409,852 | A | * | 8/1889 | Merrill | 248/284.1 |
|---|---|---|---|---|---|
| 436,120 | A | * | 9/1890 | Chubbuck | 248/200 |
| D31,595 | S | * | 10/1899 | Torpey | D30/143 |
| 666,779 | A | * | 1/1901 | Torpey | 248/304 |
| 1,051,893 | A | * | 2/1913 | Joseph | 411/344 |
| 1,933,218 | A | * | 10/1933 | Miller | 47/46 |
| 4,049,225 | A | * | 9/1977 | Chasen et al. | 248/219.4 |
| 4,602,757 | A | * | 7/1986 | Signorelli | 248/223.41 |
| 4,852,838 | A | * | 8/1989 | Field | 248/222.13 |
| 4,922,681 | A | * | 5/1990 | Russwurm et al. | 52/740.5 |
| 5,558,307 | A | * | 9/1996 | Klein et al. | 248/309.1 |
| 5,779,294 | A | * | 7/1998 | Magri | 294/61 |
| 5,981,004 | A | * | 11/1999 | Kostic | 428/16 |
| 6,234,436 | B1 | * | 5/2001 | Kump | 248/220.21 |
| 2002/0063191 | A1 | * | 5/2002 | Williamson | 248/309.1 |

* cited by examiner

*Primary Examiner*—Carl D. Friedman
*Assistant Examiner*—Bradley Duckworth
(74) *Attorney, Agent, or Firm*—Bracewell & Giuliani LLP

(57) ABSTRACT

A system for mounting taxidermy animal trophies on mounting devices comprises a support platform having a rod protruding therefrom. The rod is a ribbed member having a large plurality of features for securing an animal mount, such as a skull, thereto. For example, the ribbed member may comprise a concrete reinforcement bar that may be sized in diameter and length according to the size of the mount. The rod uses the natural occurring or existing hole or holes in the back of the skull for support thereof. The rod may extend straight from the support platform, such as for wall mounting purposes, or may comprise a bent portion at a distal end thereof for surface display of the mount.

3 Claims, 2 Drawing Sheets

SYSTEM AND APPARATUS FOR MOUNTING A TAXIDERMY TROPHY

BACKGROUND OF THE INVENTION

1. Technical Field

The present invention relates in general to taxidermy and, in particular, to an improved system, method, and apparatus for mounting taxidermy animal trophies on mounting devices.

2. Description of the Related Art

There are numerous types of hangers and supports available to taxidermists. These hangers are attached to a mounted specimen and then hung on a wall or plaque for display purposes. One type of prior art device uses a panel or support panel with a smooth rod extending therefrom. The rod is typically bolted to the support panel. The skull of an animal is then placed on the smooth rod. The space between the rod and the skull is then filled with a fill material, such as fiberglass or Bondo. The fill material ensures that the skull stays correctly positioned on the rod, but also permanently attaches the skull to the rod. Although this design is workable, an improved mounting device for mounting taxidermy animal trophies would be desirable.

SUMMARY OF THE INVENTION

One embodiment of a system, method, and apparatus for mounting taxidermy animal trophies on mounting devices comprises a support platform having a rod protruding therefrom. The rod is a ribbed member having a large plurality of features for securing an animal mount, such as a skull, thereto. For example, the ribbed member may comprise a concrete reinforcement bar that may be sized in diameter and length according to the size of the mount. The rod uses the natural occurring or existing hole or holes in the back of the skull for nonobtrusive support thereof. The rod may extend straight from the support platform, such as for wall mounting purposes, or may comprise a bent portion at a distal end thereof for surface (e.g., desk) display of the mount.

The foregoing and other objects and advantages of the present invention will be apparent to those skilled in the art, in view of the following detailed description of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF THE INVENTION

Figure 1:
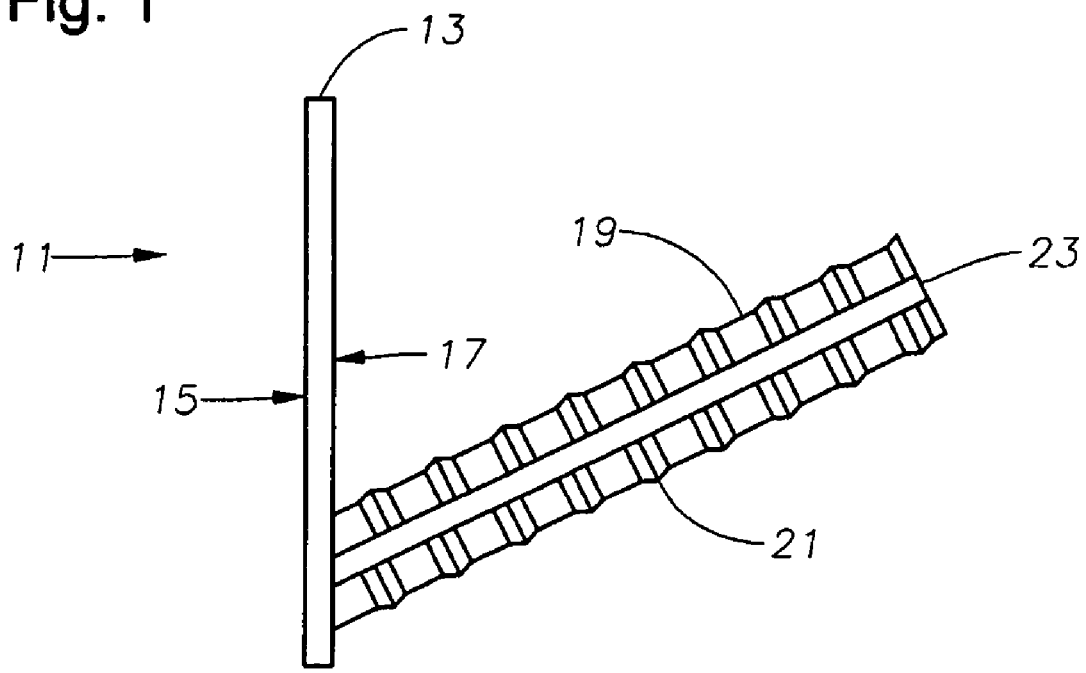
FIG. 1 is a side view of one embodiment of a trophy mount constructed in accordance with the present invention.
Figure 2:
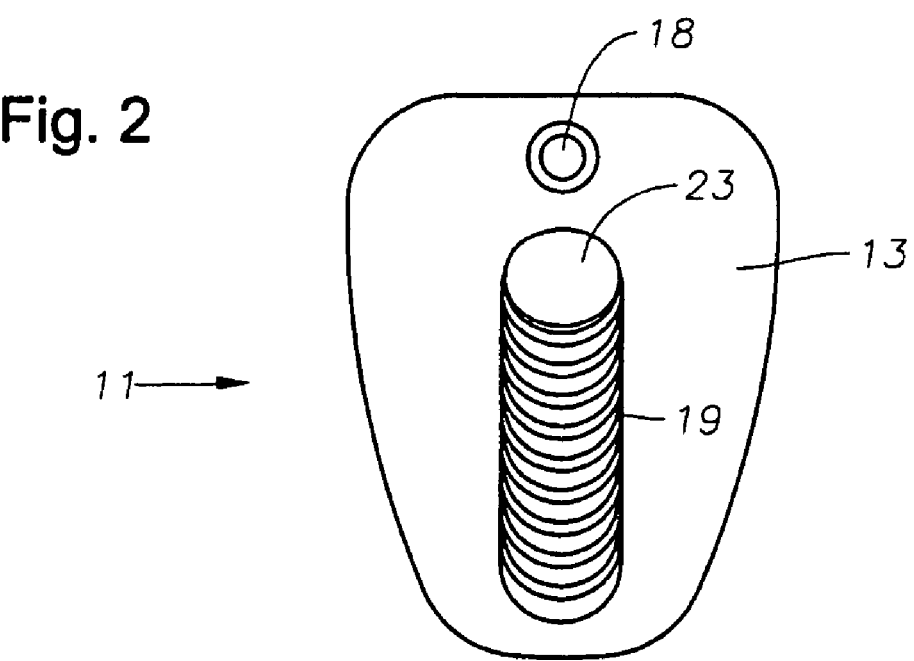
FIG. 2 is a front view of the trophy mount of FIG. 1.

Referring to FIGS. 1 and 2, one embodiment of an apparatus 11 for mounting taxidermy animal trophies is shown. Apparatus 11 is well suited for mounting an animal mount, such as animal skull, thereto for support and display on a vertical wall. Apparatus 11 comprises a support platform 13 having a base surface 15 adapted to abut an adjacent support surface (e.g., a vertical wall) for the apparatus 11. Apparatus 11 also has an opposite surface 17 and one or more mounting features 18 (e.g., a hole(s)) for securing apparatus 11 to the wall. Mounting feature 18 may be formed only in base surface 15, or extend all the way through support platform 13 to opposite surface 17.

A support bar 19 extends from support platform 13. The support bar 19 is designed to distance the animal mount away from support platform 13 a sufficient distance for display thereof. In one embodiment, the support bar 19 comprises a concrete reinforcement bar formed from steel. The bar 19 may be welded to and extend from the support platform 13 as shown. In one embodiment, the bar 19 is oriented at a non-orthogonal angle (for example, 30 to 85 degrees) with respect to a plane of the opposite surface 17. The bar 19 has a plurality of ribs 21 formed thereon along an axis thereof. In one embodiment, the ribs 21 are spaced apart from each other in the axial direction of bar 19 and extend radially with respect to the axis. The ribs 21 may be designed to circumscribe the bar 19 completely, or for only a portion of the outer surface of the bar 19. In addition, one or more longitudinal or axial ribs may be used along the length of the bar 19.

The bar 19 has a distal end 23 that inserts into the skull of an animal for support thereof. The ribs 21 on the distal end 23 form an interference fit between features located inside the animal skull and the bar 19. The distal end 23 is adapted to be inserted into a spinal column hole formed in the animal skull. The bar 19 may be formed with any usable length and diameter, but a suitable diameter range for animals may comprise 0.5 to 1.25 inches, depending on the application. For example, a half-inch bar is well suited for bobcat, javelina, and small feral hog. The ⅝-inch bar is well suited for most deer and small black bear. In this adaptation, a geometric center of the animal skull should aesthetically align with a geometric center of the support platform 13. The center of gravity of the mount also should be forward of the distal end 23 of the bar 19.

Figure 4:
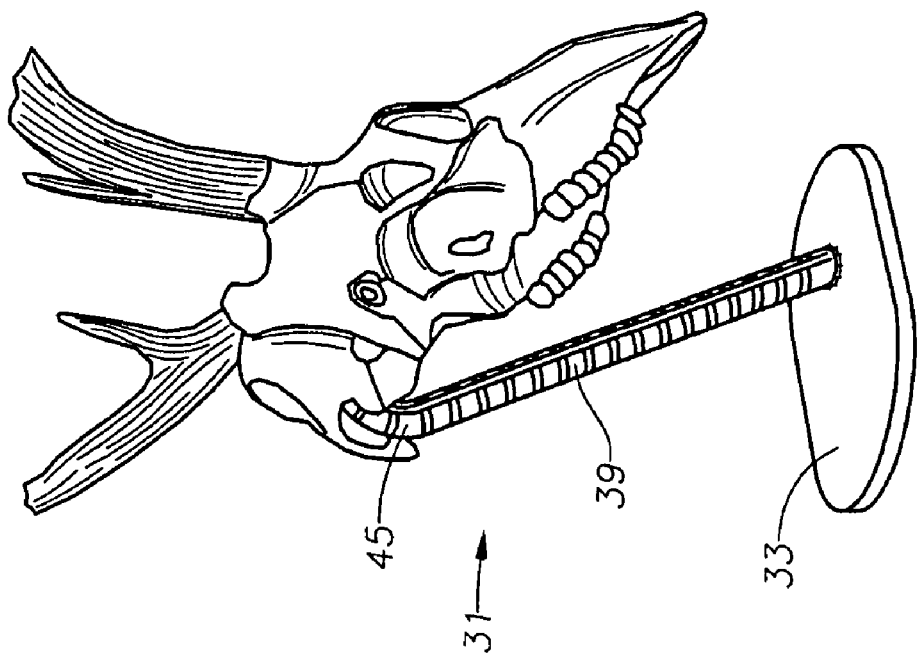
FIG. 4 is an isometric view of the trophy mount of FIG. 2 and is shown with an animal mount attached thereto.
Figure 3:
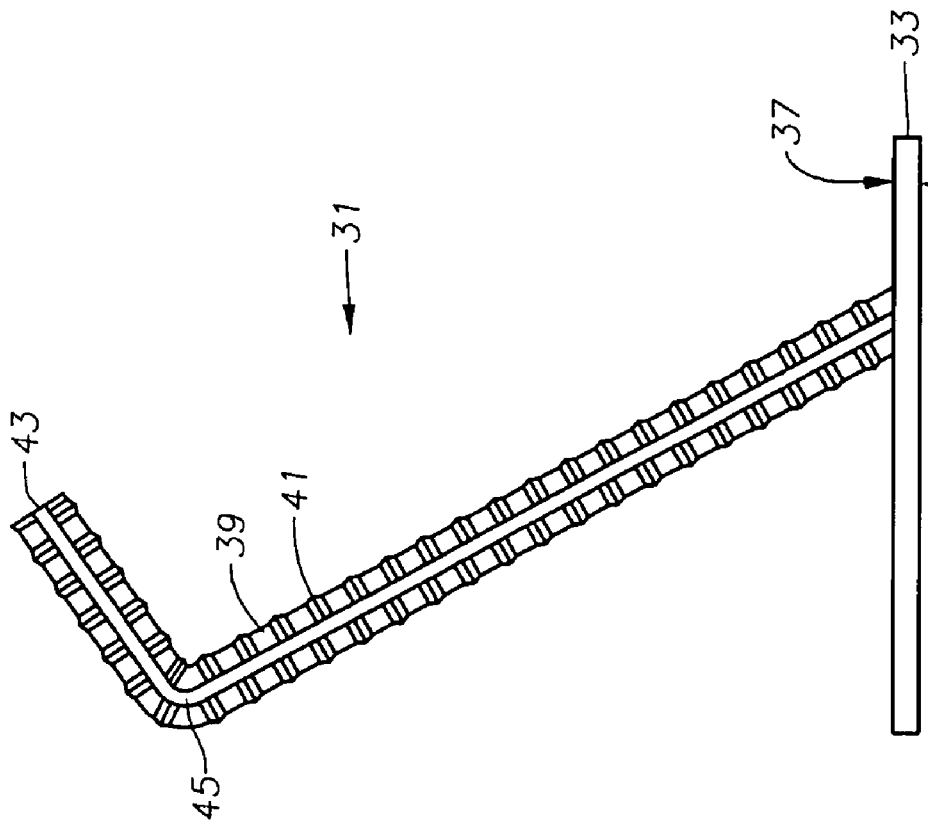
FIG. 3 is a side view of another embodiment of a trophy mount constructed in accordance with the present invention.

Referring now to FIGS. 3 and 4, another embodiment of an apparatus 31 for mounting taxidermy animal trophies is shown. Apparatus 31 is well suited for mounting an animal mount, such as animal skull, thereto for support and display on a horizontal surface, such as a desk. Apparatus 31 includes a base platform 33 with opposing surfaces 35, 37, a bar 39 with ribs 41, and a distal end 43.

Apparatus 31 is similar in many respects to the previously described apparatus 11, except for a bend 45 formed in the bar 39 between the distal end 43 and the support platform 33. The bend 45 may be formed at an angle in a range of 30 to 90 degrees with respect to the main body or a proximal end of the bar 39. In this version, a center of gravity of the animal skull is aligned with a geometric center of the support platform 33 as shown.

The present invention has several advantages, including the ability to mount animal skulls and the like in a manner that allows them to be readily removed from the underlying support structure. The mounting device does not require any additional fill material to retain the animal mount on the support structure. Rather, the fit between ribs on the rod extending from the support structure and the animal mount permit secure, resilient, and accommodating fit therebetween. Moreover, the interior of the skull does not have to be textured to achieve a good fit. The support structure may be formed from many different types of material such as wood or metal. The rod may be welded to metal support structures and painted any color.

While the invention has been shown or described in only some of its forms, it should be apparent to those skilled in the art that it is not so limited, but is susceptible to various changes without departing from the scope of the invention.

What is claimed is:

1. A taxidermy system for mounting animal trophy skulls, comprising:
   a support platform having a base surface for abutting an adjacent support surface for the apparatus and an opposite surface;
   a concrete reinforcement bar welded to and extending from the support platform at a nonorthogonal angle with respect to a plane of the opposite surface, the concrete reinforcement bar having at least one axial rib extending along a length thereof, and a plurality of ribs formed thereon along an axis thereof such that the ribs circumscribe the concrete reinforcement bar and the ribs are spaced apart from each other in the axial direction and extending radially with respect to the axis;
   an animal skull mounted to the concrete reinforcement bar such that the concrete reinforcement bar extends through the animal skull for support thereof, the ribs forming an interference fit between features located inside the animal skull and the concrete reinforcement bar; and
   a center of gravity of the animal skull is aligned with a geometric center of the support platform.

2. A taxidermy system according to claim 1, wherein the concrete reinforcement bar has a diameter in a range of 0.5 to 1.25 inches.

3. A taxidermy system according to claim 1, wherein a distal end extends through a spinal column hole formed in the animal skull.

* * * * *